Dec. 26, 1961 R. C. CROOKS 3,014,364
MEANS FOR TESTING BOND STRENGTH
Filed June 25, 1956 2 Sheets-Sheet 1

INVENTOR.
ROBERT C. CROOKS
BY
George C. Sullivan
Agent

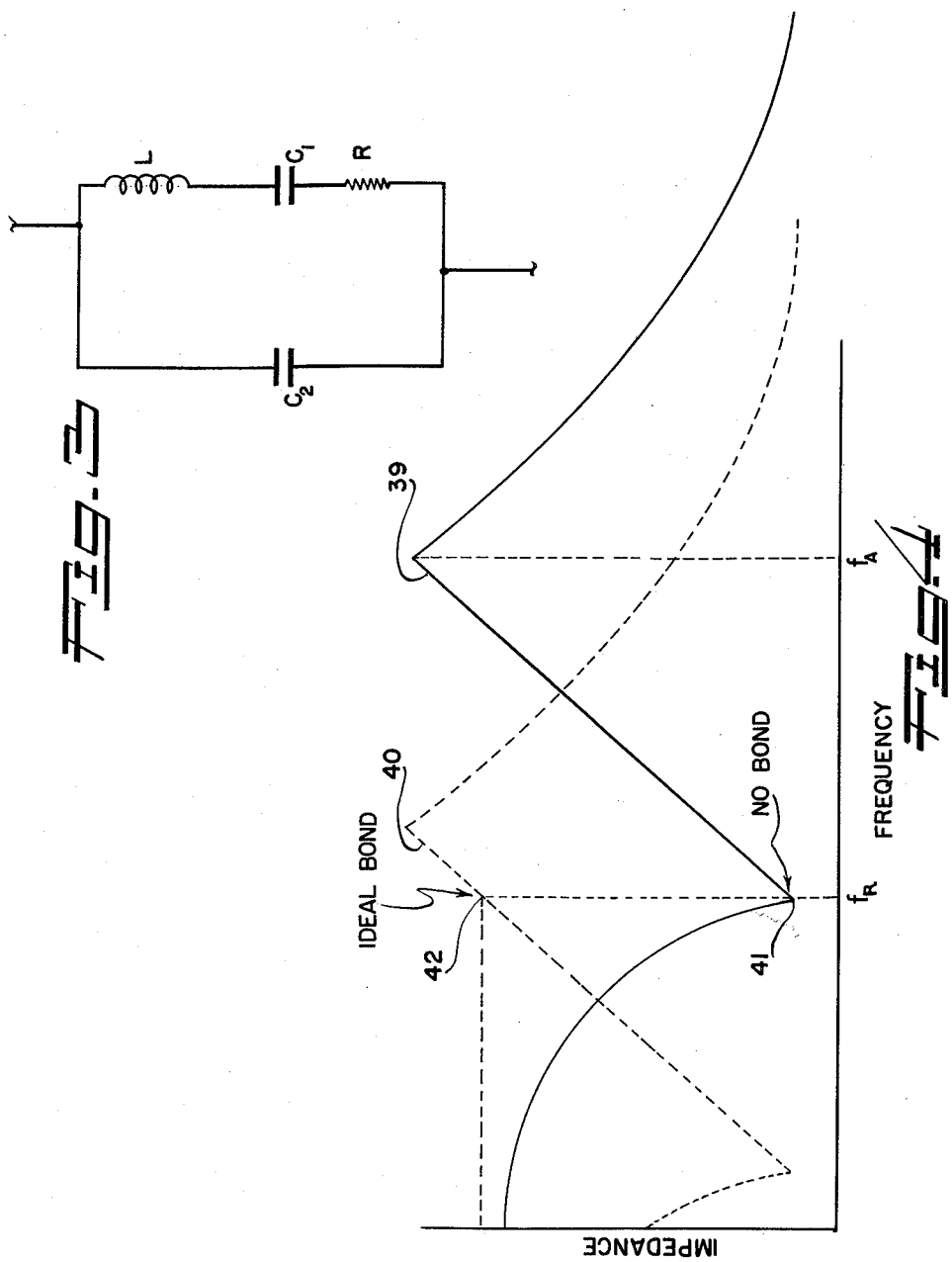

3,014,364
MEANS FOR TESTING BOND STRENGTH
Robert C. Crooks, Temple City, Calif., assignor to Lockheed Aircraft Corporation, Burbank, Calif.
Filed June 25, 1956, Ser. No. 593,739
3 Claims. (Cl. 73—67.1)

This invention relates generally to test equipment and more particularly to a device for inspecting the quality of a bond between at least two pieces of material, such as sheet metal or the like.

Briefly described, the invention consists of generating an ultrasonic continuous wave signal of substantially constant average energy level for driving a piezoelectric transducer arranged in parallel with an energy measuring circuit. The transducer when seated on the part to be inspected exhibits a characteristic impedance which is proportional to the magnitude of the restraint against the vibration of the transducer. This impedance level which is established by the bond strength of the part under inspection controls the energy level flowing in the energy measuring circuit whereby an indication of bond quality may be obtained in terms of bond strength relative to that exhibited by a similar part of known bond quality.

The use of adhesive bonding techniques in making structural joints has been heretofore limited to a great extent by the inadequacies in inspecting the quality of a bond. Where fastening devices such as rivets are employed for joining structural parts, it is easy to determine whether or not the joint is satisfactory by visual inspection, however, where the parts are joined by an adhesive material, this is not possible. Accordingly, conventional techniques for inspecting the quality of an adhesive bond require destruction of the part, that is, the part is opened or cut away so that access to the bond area may be obtained. Thus, by conventional practice it is virtually impossible to accomplish quality control other than by spot inspection methods on parts joined by an adhesive.

There are adhesive bonding materials now commercially available, which are capable of joining even metal parts together, and providing at least as strong a joint as can be obtained with conventional fasteners such as rivets or bolts while at the same time provide a substantial savings in the weight as well as the manufacturing cost of the part. A need therefore exists to provide a reliable nondestructive technique for inspecting the quality of an adhesive bond.

An object of this invention is to provide a device for inspecting the quality of an adhesive bond between two or more pieces of material without damaging the material or the bond.

Another object of this invention is to provide a device for inspecting the quality of an adhesive bond on any part configuration or any kind of material including metals wherein the device is direct reading in terms of bond strength relative to a known good bond.

Another object of this invention is to provide a device for inspecting the quality of an adhesive bond which is reliable and easy to operate.

Still another object of this invention is to provide a device for inspecting the quality of an adhesive bond which may be packaged as a portable unit for use in the field as well as for quality control of structural parts during their manufacture.

Futher and other objects will become apparent from a reading of the following description especially when considered in combination with the accompanying drawing wherein like numerals refer to like parts.

In the drawing:

FIGURE 3 is an electrical equivalent diagram for the transducer; and

FIGURE 4 shows graphically the change in transducer impedance with respect to frequency.

Figures 1, 2:
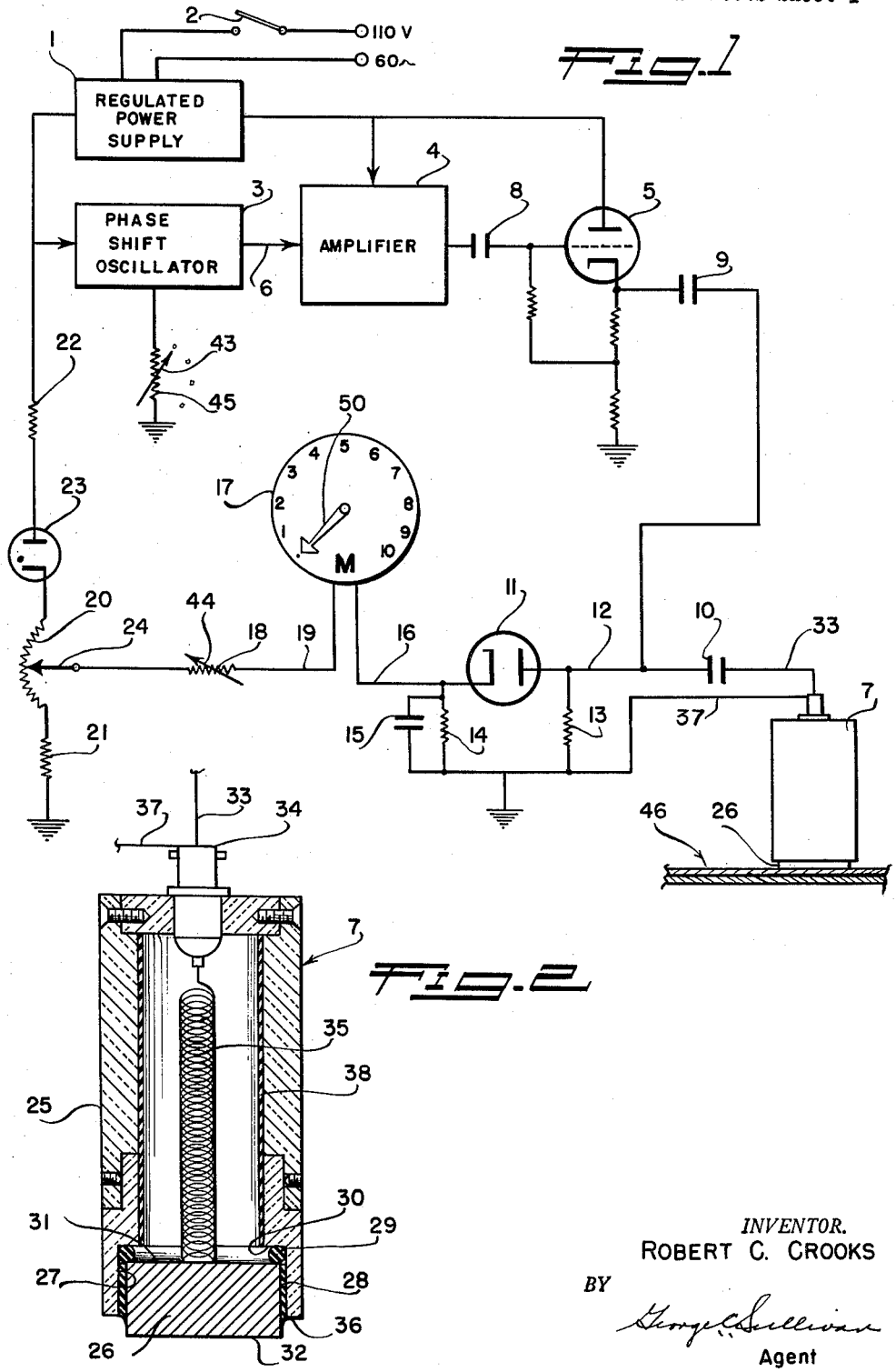
FIGURE 1 is a view schematically showing the bond testing device of this invention.
FIGURE 2 is a sectional side view of the piezoelectric transducer employed in the bond testing device of FIGURE 1.

Referring to FIGURE 1 the device includes a regulated power supply 1 connecting with a suitable source of electrical potential such as a 110 volt 60 cycle source through switch 2. The power supply provides the necessary voltages for driving an oscillator 3, an amplifier 4, and a cathode loaded amplifier 5. Oscillator 3 is preferably of the phase shift type having a stable, continuous wave, alternating current output of substantially constant amplitude or energy level at any given frequency. The output 6 of oscillator 3 is amplified to the desired signal level in amplifiers 4 and 5 for driving transducer 7. Suitable blocking capacitors 8, 9 and 10 are employed in the circuit of the cathode loaded amplifier 5 and transducer 7 to isolate these components from direct current.

The low impedance output from the cathode loaded amplifier, in addition to being applied to transducer 7, is also applied to a diode 11 through lead 12. Diode 11 is biased by resistors 13 and 14 and capacitor 15 for rectifying the alternating current signal applied thereto through lead 12. The output from diode 11 carried by lead 16 is a direct current signal, the amplitude of which is proportional to the characteristic impedance of transducer 7. The higher the impedance of the transducer, the greater the energy level of the rectified output from diode 11.

A milliammeter galvanometer 17 connects with lead 16 from diode 11 and with a variable resistor 18 through lead 19. Resistor 18 connects with ground through potentiometer 20 and biasing resistor 21 to complete a circuit from diode 11 through milliammeter 17 whereby a measurement of the direct current energy at the output of the diode may be obtained.

A balancing voltage is applied to potentiometer 20 from power supply 1 through a load resistor 22 and a suitable voltage regulating gas tube 23. By adjusting pickup arm 24 on potentiometer 20 current flow through milliameter 17 may be regulated for calibrating the device as hereinafter described.

Transducer 7 as shown in FIGURE 2 includes a tubular housing 25 shaped for conveniently holding a piezoelectric crystal 26 preferably of a ceramic material such as barium titanite. Crystal 26 is slidably received within a bore 27 formed in one end of housing 25 and is held in place by a suitable layer of rubber type elastic cement 28 which is sufficiently thin and resilient to allow relative movement between the crystal and housing 25 in an axial direction and restrain it against movement in a lateral direction. As shown in the drawing, a resilient washer 29 may be inserted in the housing between crystal 26 and an abutment 30 for reducing the shear loads on the elastic cement used to hold the crystal in position.

Conductive coatings 31 and 32 are secured to the top and bottom surfaces respectively of crystal 26 to serve as electrodes for applying the alternating electric field to the crystal to make it vibrate. The electric field is generated by oscillator 3 (FIGURE 1) and applied to crystal 26 through lead 33 and a coaxial fitting 34 secured to transducer housing 25. Fitting 34 includes a spring wire 35 carried inside housing 25 which connects lead 33 with conductive coating 31 on crystal 26. Spring wire 35 is wound for exerting substantially no resistance to the vibration of the crystal. A circuit is completed from the transducer to ground through a short cnductive strip 36 from conductive coating 32 to housing 25 in addition to a lead 37. Conductive strip 36 may comprise simply a thin coat of metallic paint such as silver paint applied with a brush or spray. Lead 37 is secured to the outer conductor of coaxial fitting 34 and connected to ground. To prevent short circuiting the crystal, the layer of cement 28 and resilient washer 29 are selected from nonconductive materials. As further protection against developing a short circuit, an insulating sleeve 38 lines the inner wall of housing 25 electrically separating spring wire 35 from the conductive wall of the housing. Thus, a circuit through the transducer is completed only by an electric field at piezoelectric crystal 26.

While a knowledge of the details of the transducer construction are needed for an understanding of this invention, it should be understood that such information forms a part of this invention only as an element in the combination.

The piezoelectric material used for crystal 26 should preferably be of the type having resonance and antiresonance frequencies relatively close together, say, in the neighborhood of 5 to 10 kilocycles apart, such as that exhibited by barium titanite. This narrow frequency range is important not only because the sensitivity of the device is increased by a narrower band width, but also because the oscillator frequency range may then be small without limiting the use of the device.

The characteristics of a barium titanite piezoelectric crystal which causes it to exhibit a change in impedance when restrained is described in connection with FIGURES 3 and 4. In the electrical equivalent diagram of FIGURE 3, $C_2$ represents the capacity between the conductive coatings 31 and 32 on the top and bottom of crystal 26, L is the mechanical inertia or inductance of the crystal, $C_1$ is the mechanical compliance of the crystal, which varies inversely with stiffness, and R is the mechanical loss. The resonance and antiresonance frequencies $F_R$ and $F_A$ are produced by the combination of L, $C_1$, $C_2$ and R. For the series resonant frequency (resonance), the combination of L and $C_1$ control wherein a circuit of very low impedance is obtained limited only by the mechanical loss R. At the parallel resonant frequency (antiresonance), L and $C_2$ form a parallel circuit with a high impedance limited by the "$q$" of the crystal, which depends on the mechanical loss R and the crystal mounting.

By changing the mechanical intertia L of the crystal and the mechanical compliance $C_1$ thereof, the resonance and antiresonance frequencies can be shifted as indicated in FIGURE 4. Curve 39 represents the impedance characteristics of the crystal at different frequencies under one specific load condition and curve 40 shows the impedance characteristics under a different loading condition wherein the load is a force restraining crystal vibration. When crystal 26 is coupled to a greater load (more resistance offered to vibration of the crystal) the greater becomes the mechanical inertia L and the smaller becomes the crystal mechanical compliance $C_1$, thus changing the frequencies at which the resonance and antiresonance conditions occur. As is apparent from FIGURE 4, the curves do not change shape, but merely shift along the frequency ordinate with changes in load.

If the crystal is coupled to a single thickness of material of the same kind and configuration as that which is to be inspected and the frequency of the output from oscillator 3 is adjusted to the series resonant frequency of the crystal, the impedance of the crystal is very low and consequently the voltage across it is low. This is represented by the resonance frequency point 41 shown in FIGURE 4 which represetnts "no bond." If the crystal is then coupled to a sample part like the part to be inspected, but having a known good bond, L increases and $C_1$ decreases to a point which begins to approach resonance with $C_2$ (antiresonance) and the impedance increases by an amount depending upon the increased resistance to vibration of the crystal. This condition is represented in FIGURE 4 at point 42 and may be termed the "ideal bond." When the device is calibrated to the above conditions, the crystal will assume an impedance value somewhere between the limits of the "no bond" value and the "ideal bond" value, depending upon the loading exterted on the crystal by the part of unknown bond quality.

Since the resonance frequency of crystal 26 depends upon the vibration restraint exerted by the material to which the transducer is coupled, it is necessary to provide means for adjusting the frequency of oscillator 3 by suitable means such as that shown in FIGURE 1, wherein a variable resistor 45 is employed as a part of the oscillator phase shift network.

The operation of the device can best be understood by following through the procedure for inspecting the quality of a bond of a particular part such as 46 shown in FIGURE 1. First switch 2 ils closed energizing the circuit. Oscillator 3, when the circuit is energized, generates an alternating current signal of substantially constant amplitude and frequency, which signal is applied to transducer 7 through amplifier 4 and the low impedance cathode loaded amplifier 5. The piezoelectric crystal 26 in transducer 7 is thereby caused to vibrate at the output frequency of the oscillator and exhibit a characteristic impedance which depends upon frequency and the resistance to vibration offered by the part 46 to which the crystal is coupled. To calibrate the device, assume part 46 is a sample of known bad bond quality where there is no bond between the sheets of material making up the part. In the presence of this bond condition, the device is calinbrated by moving arm 43 of variable resistor 45 until the frequency of the oscillator output signal is at the transducer series resonant frequency. Since the impedance of the transducer is a minimum as indicated in FIGURE 4 when the transducer is at the resonance frequency, this condition may be readily observed when indicator 50 on meter 17 is at a minimum. The indicator will rise sharply when adjusting the oscillator frequency in either direction from the resonance frequency adjustment. With the oscillator properly adjusted so that indicator arm 50 is at its minimum position, current flow through the milliammeter may not provide a zero reading and accordingly, it is necessary to adjust potentiometer 20 by moving its arm 24 until meter 17 reads zero, representing the "no bond" condition for the part. Next, the device is calibrated to read full scale on meter 17 with a similar part of known good bond quality. This is accomplished by maintaining the oscillator at the "no load" resonance frequency and placing the part of known good bond quality into engagement with crystal 26 in transducer 7 and moving arm 44 on resistor 18 until indicator arm 50 on meter 17 reads full scale. This indicates the "ideal bond" condition. Such a part of known good bond quality would normally be manufactured in a laboratory under closely controlled conditions with areas of the part adjacent to the bond area to be inspected by the device broken away for visual inspection. With the device so calibrated both as to the maximum and minimum bond strength, parts of unknown bond quality may be coupled to transducer 7 and inspected by the device. The indication arm on meter 17 provides a reading in terms of the relative bond strength.

The device may be calibrated for a variety of different part configurations and materials by simply marking variable resistors 18 and 45 and potentiometer 20 to indicate the proper setting for each specific part on which the device is to be used. This will avoid having to go through the calibrating procedure each time a different kind of part is to be inspected.

The use of gas tube 23 in the FIGURE 1 circuitry provides a closely regulated source of energy for biasing meter 17 to zero and preventing drift in the indicating device.

Since the part engaging surface 32 of the transducer crystal as well as the part iself is not perfectly flat, it is usually necessary to apply oil or a wetting agent to the surface of the part to effect adequate coupling therebetween when making an inspection.

The resistance to the vibration movement of crystal 26 offered by the part being inspected is an accurate indication of the bond strength between the sheets of material making up the part and hence, by properly calibrating the device to indicate changes in impedance of the crystal between its series and parallel resonant frequencies, a dependable and accurate direct reading indication of relative bond strength may be made. As the resistance to vibration of the transducer crystal is increased, its mechanical inertia L is increased and correspondingly its mechanical compliance $C_1$ is decreased, bringing about a shift in the series resonant frequency of the crystal as indicated in FIGURE 4. By holding the oscillator frequency in the device constant after being adjusted for the proper frequency for a "no bond" condition the crystal impedance is increased in proportion to the increase in rigidity and mechanical inertia of the parts under test having a bond better than "no bond." This increase in impedance results in more of the oscillator signal energy being applied through the circuit which includes meter 17. As the energy through the meter increases a direct indication of this increase in energy is obtained.

When the device is to be used as an inspection tool to simply identify satisfactory and unsatisfactory parts, the known good bond calibration procedure set forth hereinabove may be eliminated in lieu of adjusting resistor 18 to provide a mid-scale meter reading for a part of minimum acceptable quality and using that point to indicate the cross over between acceptable and unacceptable parts. This calibrating procedure requires pull testing the part used in the calibration procedure to identify it as a part of minimum bond quality.

The device is well suited to inspecting the quality of the bond in many different types of structures including low density sandwich panel structures having a cellular core interposed between outer skins. In inspecting a sandwich panel, however, the size of the seating surface on the transducer crystal should be several times larger than the size of the cells in the core material.

It is to be undertood that certain alterations, modifications and substitutions may be made to the instant disclosure without departing from the spirit and scope of the invention as defined by the appended claims.

I claim:

1. A device for inspecting the quality of a bond between at least two pieces of material comprising, a source of electrical potential, an oscillator connecting with said source of electrical potential and generating a continuous wave output signal of substantially constant amplitude and frequency, rectifier circuit means coupling the oscillator output to ground, said rectifier circuit means including a galvanometer providing a measurement of the electrical energy flowing therethrough, and piezoelectric transducer means having a substantially linear impedance change between the resonance and antiresonance vibration frequencies excited by the output from said oscillator to vibrate at the resonant frequency representing a reference bond quality and arranged in parallel with said rectifier circuit means to direct a portion of the energy in the oscillator output signal to ground, bypassing said rectifier circuit means, the magnitude of the energy portion bypassing the rectifier circuit means varying substantially linearly with the magnitude of the vibration restraint imposed on the transducer when seated on the material to be inspected, said rectifier circuit means including a calibrating potentiometer establishing a biasing voltage setting the lower limit minimum bond quality galvanometer reading, and a calibrating gain control variable resistor coupling the potentiometer with the galvanometer and setting the upper limit maximum bond quality galvanometer reading whereby the galvanometer provides a direct reading indication of relative bond strength.

2. A device for inspecting the quality of a bond between at least two pieces of material comprising, oscillator means generating a continuous wave signal at a predetermined frequency, transducer means having a substantially linear impedance change between the resonance and anti-resonance vibration frequencies responsive to said continuous wave signal for vibrating the material on contact at the resonant frequency of the transducer means representing a reference bond quality, and energy measuring means connecting with said transducer means and providing an indication of the magnitude of the resistance to vibration exerted by the material, said energy measuring means including a galvanometer, potentiometer means establishing a biasing voltage calibrating the galvanometer for a minimum reference bond quality, and gain control variable resistance means coupling the galvanometer with said potentiometer means and calibrating the galvanometer for a maximum reference bond quality.

3. A device for measuring the bond strength between at least two pieces of material comprising, oscillator means generating a continuous wave signal of substantially constant amplitude and frequency, transducer means having a substantially linear impedance change between the resonance and antiresonance vibration frequencies responsive to said continuous wave signal for vibrating the material on contact at the resonant frequency of the transducer means representing a reference bond quality galvanometer means connecting with said transducer means and providing an indication of the bond quality of the material relative to the reference bond quality, and dual calibrating means biasing said galvanometer means for both maximum and minimum readings to provide a direct reading indication of bond strength.

References Cited in the file of this patent

UNITED STATES PATENTS

| | | |
|---|---|---|
| 2,345,679 | Linse | Apr. 4, 1944 |
| 2,431,233 | Erwin | Nov. 18, 1947 |
| 2,439,131 | Firestone | Apr. 6, 1948 |
| 2,499,459 | Carlin | Mar. 7, 1950 |
| 2,618,968 | McConnell | Nov. 25, 1952 |
| 2,661,714 | Greenwood | Dec. 8, 1953 |
| 2,705,422 | Henry | Apr. 5, 1955 |
| 2,846,874 | Horn | Aug. 12, 1958 |
| 2,851,876 | Arnold | Sept. 16, 1958 |
| 2,903,886 | Renaut | Sept. 15, 1959 |

OTHER REFERENCES

Pages 1–15, Wright Air Development Center Technical Report 54–231, Part 3, Development of Non-Destructive Tests for Structural Adhesive Bonds, Mechanical Impedance Technique, published April 1955.